(12) United States Patent
Guehler et al.

(10) Patent No.: US 6,221,543 B1
(45) Date of Patent: Apr. 24, 2001

(54) PROCESS FOR MAKING ACTIVE SUBSTRATES FOR COLOR DISPLAYS

(75) Inventors: Paul F. Guehler, White Bear Lake; Thomas A. Isberg, Minneapolis, both of MN (US); Kazuhiko Mizuno, Tokyo; Kazuki Noda, Sagamihara, both of (JP); Raghunath Padiyath, Woodbury, MN (US); Richard J. Pokorny, Maplewood, MN (US); John S. Staral, Woodbury, MN (US); Jeffrey C. Chang, North Oaks, MN (US)

(73) Assignee: 3M Innovatives Properties, St. Paul, MN (US)

( * ) Notice: Subject to any disclaimer, the term of this patent is extended or adjusted under 35 U.S.C. 154(b) by 0 days.

(21) Appl. No.: 09/312,504

(22) Filed: May 14, 1999

(51) Int. Cl.[7] ............ G02B 5/20; G02F 1/1335

(52) U.S. Cl. ............ 430/7; 430/200; 430/945

(58) Field of Search ............ 430/7, 200, 945; 349/106

(56) References Cited

U.S. PATENT DOCUMENTS

| | | |
|---|---|---|
| 4,704,559 | 11/1987 | Suginoya et al. . |
| 4,712,874 | 12/1987 | Sekimura et al. . |
| 4,975,410 | 12/1990 | Weber et al. . |
| 5,058,997 | 10/1991 | Dickerson et al. . |
| 5,062,691 | 11/1991 | Tristani-Kendra et al. . |
| 5,071,502 | 12/1991 | Hashimoto et al. . |
| 5,082,587 | 1/1992 | Janulis . |
| 5,254,747 | 10/1993 | Janulis . |
| 5,340,619 | 8/1994 | Chen et al. . |
| 5,377,033 | 12/1994 | Radcliffe . |

(List continued on next page.)

FOREIGN PATENT DOCUMENTS

| | | |
|---|---|---|
| 0 529 362 A1 | 3/1993 | (EP) . |
| 556 809 | 8/1993 | (EP) . |
| 0 365 222 B1 | 12/1994 | (EP) . |
| 702 250 | 3/1996 | (EP) . |
| 759 564 | 2/1997 | (EP) . |
| 1-20157 | 8/1990 | (JP) . |
| 8-38629 | 3/1997 | (JP) . |
| 10-332930 | 12/1998 | (JP) . |
| 11-14979 | 1/1999 | (JP) . |
| 10-87779 | 1/2000 | (JP) . |
| WO 95/17691 | 6/1995 | (WO) . |

OTHER PUBLICATIONS

John Z. Z. Zhong et al., "New AMLCD Structure—Color Filter Passivated α–Si TFT", *Asia Display*, 1998, pp. 113–116.

G. de Keyzer et al., "Latent Pigment Resists for Colour Filters, The Manufacture of High Resolution Colour Filters using a Novel Pigmented Photo Resist System," *IDW, SID*, 1997, Nagoya, Japan, pp. 371–374.

Primary Examiner—John A. McPherson
(74) Attorney, Agent, or Firm—Robert J. Pechman

(57) ABSTRACT

An improved electronic display that includes components selected to enhance display performance. The improved display includes an active substrate that has a plurality of thin film transistors and a plurality of thermally transferred color filters that include a colorant in a crosslinked binder. The active substrate can also include a black matrix. Other components in the improved display such as a liquid crystal material, spacers, and bottom polarizer, can be selected to enhance display performance characteristics such as brightness, power consumption, response time, weight, and thickness. The invention also provides a method of forming a color filter substrate for displays including the steps of thermally mass transferring a plurality of color filters and crosslinking the plurality of color filters after transfer. Before the crosslinking step, the plurality of color filters can be inspected and removed for reworking of the substrate.

15 Claims, 3 Drawing Sheets

U.S. PATENT DOCUMENTS

| | | |
|---|---|---|
| 5,417,883 | 5/1995 | Epstein et al. . |
| 5,437,812 | 8/1995 | Janulis et al. . |
| 5,521,035 | 5/1996 | Wolk et al. . |
| 5,591,990 | 1/1997 | Misawa et al. . |
| 5,650,867 | 7/1997 | Kojima et al. . |
| 5,658,491 | 8/1997 | Kistner et al. . |
| 5,671,030 | 9/1997 | Oknuma et al. . |
| 5,702,637 | 12/1997 | Johnson et al. . |
| 5,710,097 | 1/1998 | Staral et al. . |
| 5,714,195 | 2/1998 | Shiba et al. . |
| 5,716,740 | 2/1998 | Shiba et al. . |
| 5,725,989 | 3/1998 | Chang et al. . |
| 5,734,456 | 3/1998 | Takao et al. . |
| 5,822,026 | 10/1998 | Matsuo . |
| 5,831,705 | 11/1998 | Kaneko et al. . |
| 5,838,399 | 11/1998 | Someya et al. . |
| 5,858,273 | 1/1999 | Asoka et al. . |
| 5,926,236 | 7/1999 | den Boer et al. . |
| 6,051,318 * | 4/2000 | Kiwon .................................. 428/413 |

* cited by examiner

PROCESS FOR MAKING ACTIVE SUBSTRATES FOR COLOR DISPLAYS

The present invention pertains to improved color electronic displays, to active substrates for use in electronic displays, and to methods of making active elements that have color filters for use in electronic displays.

BACKGROUND

Difficulties can arise in the fabrication of full color active matrix liquid crystal displays (LCD), especially as demand increases for displays to become larger, brighter, thinner, and lighter, with higher resolution and faster switching times, all at a lower cost.

Active matrix LCDs commonly include a liquid crystal material disposed between an active substrate and a non-active (passive) substrate. The active substrate generally has a regular array, or matrix, of thin film transistors (TFT) arranged in pixels. To add color, color filters can be provided for each of the pixels in an LCD. Currently, color filters in active matrix displays are typically formed onto the flat, non-active display substrates, using either photolithography or direct printing techniques.

SUMMARY

Increasing the size and/or the resolution of electronic displays also increases the number of pixels to control in the display. With more pixels to control, issues regarding electronic switching speed, liquid crystal response times, and color filter alignment can become more important. For example, when assembling color LCDs, improperly aligned or otherwise defective color filters can necessitate discarding the color filter substrate during processing. The associated cost of waste, as well as the probability for error, tends to increase as the number of pixels in the display increases. In addition, there is an ever-growing desire for these displays to have thinner and lighter weight constructions, to use less power while providing enhanced brightness, and to have improved reliability and durability.

The present invention provides improved liquid crystal display constructions that have components selected to enhance overall display performance. Components can be selected to construct improved displays according to the present invention that have, for example, enhanced brightness, lower power consumption, and/or faster switching rates. The present invention also includes improved displays that can be made thinner and lighter while maintaining reliability and durability.

According to the present invention, the following components can be selected to achieve enhanced display performance. Color filters can be provided on the active substrate of an active matrix display, for example, to increase the aperture ratio of the display, resulting in more light through the display. Liquid crystal materials and alignment layers can be selected to increase response times, reduce power consumption, and increase contrast. Spacers can be provided that allow for thinner constructions that are durable. Reflective polarizers can be used that increase lighting efficiency by increasing brightness for the same lighting conditions. These and other components can be selected individually or in combination, for example to synergistically enhance one or more display performance properties.

In accordance with an aspect of the present invention there is provided an improved color active-matrix liquid crystal display. One embodiment provides an electronic display that includes (i) a light source; (ii) a polarizer disposed to transmit and substantially polarize light from the light source, and (iii) a liquid crystal display panel disposed to utilize light transmitted by the polarizer. The display panel includes a bottom substrate, a top substrate spaced a distance apart from the bottom substrate, a liquid crystal layer disposed between the substrates, and a multi-color active layer disposed between the bottom substrate and the liquid crystal layer. The multi-color active layer includes a plurality of independently addressable active elements electrically connected to transparent conductive sub-pixel elements and a plurality of color filters, each aligned with one or more of the transparent conductive sub-pixel elements. The color filters comprise a colorant in a crosslinked composition and are derived from a thermally transferred material. The liquid crystal layer can comprise a fluorinated chiral ferroelectric liquid crystal material.

In another embodiment, the present invention provides a color active-matrix liquid crystal display that has a first transparent substrate having a plurality of independently addressable thin film transistors disposed thereon, each transistor electrically connected to an associated transparent conductive sub-pixel element; a second transparent substrate spaced a distance apart from the first transparent substrate; a liquid crystal layer disposed between the first substrate and the second substrate; and a plurality of color filters disposed between the first substrate and the liquid crystal layer, the color filters comprising a thermally transferred material having a colorant disposed therein, each color filter aligned with one or more of the transparent conductive elements associated with the transistors.

One component that can be selected to improve performance in displays of the present invention is color filters. Accordingly, the present invention provides a new method of making color filters. In one aspect, multiple color filters can be transferred prior to crosslinking to allow inspection and removal (if necessary) of the color filters for reworking of the display substrate.

In one embodiment, the present invention provides a new method of making color filters for liquid crystal display substrates, including the steps of providing a display substrate, thermally mass transferring a plurality of color filters to selected portions of the substrate, each color filter comprising a colorant in a crosslinkable composition, and crosslinking the color filters after the transferring step. After transferring the plurality of color filters to the display substrate and prior to crosslinking, the color filters can optionally be inspected, for example, to determine if defects are present and if alignment is proper. If the filters do not meet inspection criteria, they can be removed by a washing step. After washing, the display substrate can be reworked by transferring another plurality of color filters.

The method of the present invention is particularly suited for thermally transferring a plurality of color filters to an active substrate for color active matrix displays. In this case, an active substrate that has a plurality of independently addressable active devices can be provided as the display substrate for thermally transferring color filters according to the invention.

BRIEF DESCRIPTION OF THE DRAWINGS

FIG. 2(*b*) is a schematic cross-sectional view of a liquid crystal display panel 310 that includes an embodiment of active substrate element 300 viewed along line 2*b* from FIG. 2(*a*).

DETAILED DESCRIPTION

The present invention pertains to improved active matrix color displays and to a method of making color display substrates. The improved displays include components selected to enhance the performance of active matrix displays. The improved displays can also include color filter substrates made according to a method of the present invention. The method includes thermally transferring multiple color filters to a display substrate and crosslinking the color filters after transfer.

Liquid crystal light modulators are commonly used in electronic displays where pixilated information is to be visually displayed to a user or an observer. Other uses for liquid crystal light modulators include data transmission devices where information is transmitted as light which can be controlled by a liquid crystal light modulator. In the case of data transmission, light can be "displayed" from one device to another device, and is not necessarily displayed directly to a user or observer. As used herein, therefore, the terms "liquid crystal display", "electronic display", and "liquid crystal light modulator" are meant to encompass electronic devices that modulate light transmission for display, whether that display is to a passive observer, an active user, an active or passive device, photographic film, a projection screen, and the like.

Figure 1:
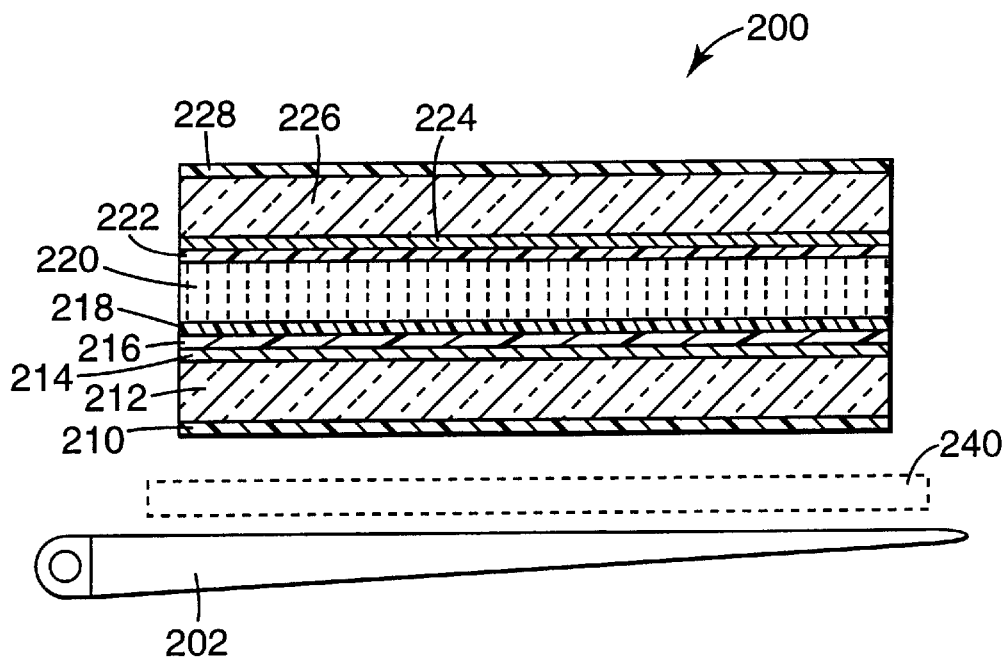
FIG. 1 is a schematic cross-section of a liquid crystal display 200.

FIG. 1 schematically shows components that can be included in an improved display 200 according to the present invention. In various embodiments, these and other components (as described in more detail below) can be selected (individually or in combination) to improve display performance characteristics, including enhanced brightness, lower power consumption, faster switching times, and thinner overall construction. In brief, selectable components of display 200 can include bottom polarizer 210, bottom substrate 212, active layer 214, color filter layer 216, bottom alignment layer 218, liquid crystal layer 220, top alignment layer 222, sustain electrode layer 224, top substrate 226, and top polarizer 228. As used throughout this document, the term "active layer" refers to a layer in an electronic display construction that includes one or more active devices, and "active substrate" refers to a substrate that has an active layer. Examples of active devices include transistors, counters, gates, and other such devices, whereas examples of passive devices include capacitors, resistors, and other such devices. These and other layers and components includeable in a display according to the present invention are described in more detail in discussions that follow.

FIG. 1 also shows internal light source 202 that can be provided to illuminate display 200. While display 200 is shown to be a transmissive display, is recognized that the various aspects of the present invention also apply to transflective and reflective displays that may be illuminated from the front using ambient light or an internal light source and front light guide.

Display 200 can optionally include various optical components and/or light management films positioned between light source 202 and polarizer 210, as indicated by region 240 in FIG. 1. The components can be provided alone or in combination to improve the overall performance of the display. Examples of suitable components include: a sheet of BRIGHTNESS ENHANCEMENT FILM (BEF) (commercially available from Minnesota Mining and Manufacturing Company, St. Paul, Minn.) used in a prisms up configuration, a prisms down configuration, and/or in combination with another sheet of BEF (e.g., two sheets oriented in a crossed prisms configuration); a sheet of a light management film sold under the trade designation DBEF (commercially available from Minnesota Mining and Manufacturing Company); a turning film or other light direction changing film; a cholesteric reflective polarizer (such as those commercially available from Nitto Denko under the trade designation NIPPOX); diffuse reflective polarizing films such as those described in U.S. Pat. No. 5,783,120 and International Publication WO 97/32223; retarder films; lenses and lens arrays; and other such films and optical components.

Figure 2A:
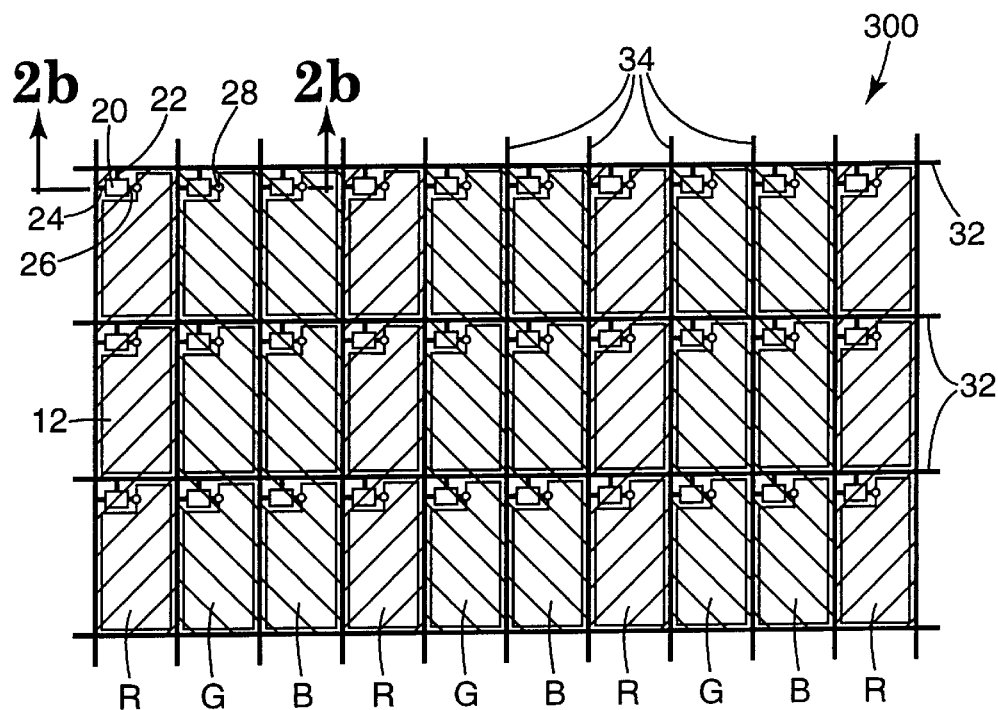
FIG. 2(*a*) is a schematic plan view of an active substrate element 300 for electronic displays.
Figure 2B:
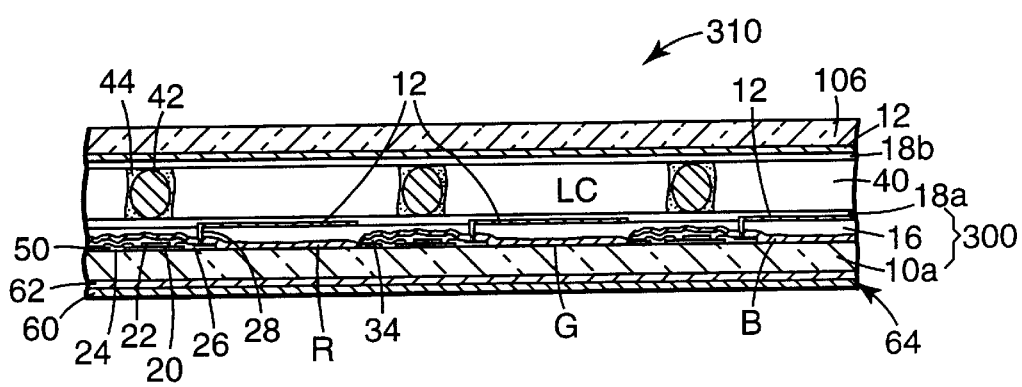

One embodiment of an improved display of the present invention is a color filter active substrate element 300 as shown in FIG. 2(a) that can be used, for example, in an active matrix LCD construction 310 as shown in FIG. 2(b). The particular embodiments are meant to be illustrative and not to limit the scope of the invention. The various components shown in FIGS. 2(a) and (b), and the selection of such components for improved overall display performance, are described in more detail below after a brief identification of various components shown.

FIG. 2(a) shows a plan view of a portion of an active substrate element 300 for an electronic display panel. Substrate element 300 can be integrated, using proper components, into transmissive, transflective, or reflective electronic displays that can range in size from microdisplays (on the order of 1 cm or less), to small displays (about 1 to several cm), to large displays (tens or several tens of cm), and to very large displays (on the order of 1 m or more). Substrate element 300 has a plurality of independently addressable devices 20, such as thin film transistors (TFTs), arranged in a regular pattern. The transistors form an active layer along with address lines and other (optional) active or passive devices that may be provided, including additional transistors, capacitors, resistors, organic or inorganic light emitting devices, and other such devices. The TFTs 20 are commonly provided in a rectangular array as shown in FIG. 2(a), although they can be arranged in any suitable manner. Transparent sub-pixel electrodes 12 can be associated with the transistors 20 to allow independent application of an electric field in each sub-pixel area to re-orient liquid crystal material in selected sub-pixels of the display. Color filters R, G, and B can be provided on the active substrate element 300 using the method of the present invention, as described in more detail below.

An individual transistor 20 can be addressed by supplying a voltage to an associated gate electrode 22 from one of a series of parallel gate driver electrodes 32 so that a signal supplied from one of a series of parallel signal driver electrodes 34 can pass from the source 24 of the transistor 20 to the drain 26 of the transistor 20. Drain 26 can be electrically connected to an associated transparent sub-pixel electrode 12. If any layers separate transparent sub-pixel electrode 12 and drain 26, the electrical connection can optionally be made via a through hole 28 in the intervening layer or layers. By so addressing a transistor, an electric field can be created in an area between the transistor's associated transparent sub-pixel electrode and an electrode supplied on an opposing substrate. The area associated with each transparent sub-pixel electrode defines a sub-pixel in the display. To add color, a color filter can be provided for each sub-pixel. In a full color display, a full pixel is made up of three adjacent sub-pixels, each having a different color filter, typically red, blue, and green (although other color combinations can be used, such as cyan, magenta, and yellow).

FIG. 2(b) shows a portion of a liquid crystal display panel 310 that includes an embodiment of the active substrate element 300 shown in FIG. 2(a). Display panel 310 is shown in cross-section taken along line 2b from FIG. 2(a). The electronic display panel 310 includes bottom (active) substrate 10a, top (non-active) substrate 10b, and a variety of components sandwiched between the substrates. Bottom substrate 10a includes a series of independently addressable TFT devices 20 that are addressable via signal driver electrodes 34 electrically connected to source electrodes 24 and gate driver electrodes (not shown) electrically connected to gate electrodes 22. Using high conductivity driver electrodes with TFTs can allow for faster switching times. Color filters R, G, and B, can be disposed on the TFTs. To prevent ambient light from undesirably inducing activation of the TFTs, an optional black matrix material 50 can also be deposited on top of the TFTs, using methods described in more detail below. Black matrix 50 can also be deposited on the active substrate to delineate sub-pixels and provide for higher contrast. Planarization layer 16 can optionally be provided to give a uniform surface on which to apply transparent sub-pixel electrodes 12.

Through holes 28 can be provided in the planarization layer 16 and color filters R, G, and B, to allow electrical connection between TFT drain electrodes 26 and transparent conductive electrodes 12 as shown in FIG. 2(b). Alignment layer 18a can be provided over the transparent conductive electrodes to orient the liquid crystal material used in the display. Top substrate 10b can also be provided with an alignment layer 18b, which can be similar or dissimilar to alignment layer 18a, depending on the desired liquid crystal alignment. Spacers 42 can be provided to maintain a uniform gap between the top and bottom substrates, and a liquid crystal material 40 can disposed in the gap between the substrates. Depending on how spacers 42 are provided, an amount of residual binder material 44 can be associated with the spacers. As described below, spacers can be selectively deposited to form a black matrix, for example, positioned directly above the TFTs to protect the transistors from undesired light-induced activation.

Top substrate 10b has a transparent electrode 12', commonly called a sustain electrode. Electrode 12' serves as a counter electrode to the sub-pixel electrodes 12. For example, sustain electrode 12' can be held at a constant potential so that applying an appropriate voltage to a selected sub-pixel electrode or electrodes creates an electric field in the selected sub-pixel area(s) to orient a liquid crystal material for transmission of light having a desired polarization state. Sustain electrode 12' can be patterned or provided as a single continuous layer.

The discussion that follows describes in further detail various components of improved displays of the present invention as introduced above and as shown in FIGS. 1, and 2(a) and (b).

In one embodiment, the performance of a display of the present invention can be improved by forming color filters on the active substrate of an active matrix display. Referring to FIG. 1, color filter layer 216 can be provided on the active layer 214 using methods in accordance with the present invention, as described in detail below. Color filters can be deposited as separate filters for each sub-pixel, or in parallel strips that span multiple sub-pixels, for example, as indicated by color filters R, G, and B in FIGS. 2(a). In either case, the color filters can be arranged so that adjacent filters include different colorants. A typical arrangement has a repeating pattern of red, green, and blue color filters, or other suitable combination of color filters (e.g., other primary colorants such as magenta, cyan, and yellow, or other color combinations that may or may not provide a display that has full color capabilities). Other repeating patterns also exist, and the particular pattern used typically depends on the arrangement of active devices and sub-pixel electrodes on the active substrate.

When color filters that contain transparent primary colorants are suitably arranged, proper activation of adjacent sub-pixels allows mixing of colors for a full color display. Color mixing can also include the introduction of gray scale. Gray scale can be introduced by spatial or temporal dithering of the electronic signal controlling the sub-pixel electrodes (as is well known in the art), or by providing a liquid crystal material that provides continuous gray scale as a function of applied field (e.g. for twisted nematic and super twisted nematic liquid crystal materials as well as for certain ferroelectric liquid crystals such as those discussed in U.S. Pat. No. 5,062,691). The combination of primary color mixing and the introduction of gray scale gives the ability to achieve a full color electronic display.

The performance of displays of the present invention can be enhanced by providing color filters on the active layer, for example, to increase the aperture ratio of the display relative to other displays that have color filters disposed on the opposing, passive substrate. Increasing the aperture ratio increases the brightness of the display. When color filters are provided in an active matrix display on the passive substrate, precise alignment can be difficult to achieve between (1) the pattern of color filters and the black matrix on the passive substrate and (2) the pattern of active devices, sub-pixel electrodes, and optional black matrix on the active substrate. To compensate for the difficulties that arise in precision alignment, the black matrix lines on the passive color filter substrate are commonly widened to ensure a certain amount of overlap between the patterns on each substrate. The patterns are overlapped to help prevent cross over of light from one sub-pixel to an adjacent sub-pixel, which can cause discoloration in the display. However, widening of the black matrix also tends to reduce the aperture ratio of the display and, in turn, reduces the amount of light transmitted through the display. By way of the present invention, the color filter layer can be provided on the active layer rather than on the passive substrate. This construction can be used to eliminate the color filter and the (widened) black matrix from the passive substrate, and thereby increase the aperture ratio and brightness of the display. By providing color filters on the active substrate, the aperture ratio of the display can be increased by 10% to 30% or more relative to constructions that have color filters and black matrix on the passive substrate.

Color filters can be provided on the active substrate between the substrate and the active layer, within the active layer, or between the active layer and the liquid crystal layer. The color filters can be provided on active substrates using any suitable method now known or later developed. Suitable methods can include conventional photolithography, thermal head or ink jet printing, colorant sublimation, and selective thermal mass transfer. Preferably, the color filters are formed by selective thermal transfer of a colorant. An exemplary method of selective thermal transfer of a colorant is laser induced thermal mass transfer of a colorant from a donor sheet to a display substrate, as described in detail below.

Thermal mass transfer occurs, for example, when portions of a donor element transfer layer are thermally transferred to a receptor so that the transferred portions remain substantially intact, that is the material within the transferred portions remains in substantially the same physical arrangement as prior to transfer. For example, thermal mass transfer includes thermal melt stick type transfers where the heat generated in the donor element is sufficient to cause portions of the transfer layer to detach at the interface between the transfer layer and the donor element support so that the detached portions of the transfer layer can be transferred as "plugs" onto a receptor. Thermal mass transfer may be a preferred transfer method as compared to other methods identified above, for example, due to high placement accuracies (i.e., when a laser is used to induce the thermal mass transfer), applicability to large and small displays as well as to high and low resolution displays, and compatibility with systems that use thermal mass transfer to provide other components (e.g., black matrix or spacers, as discussed below).

Figure 3:
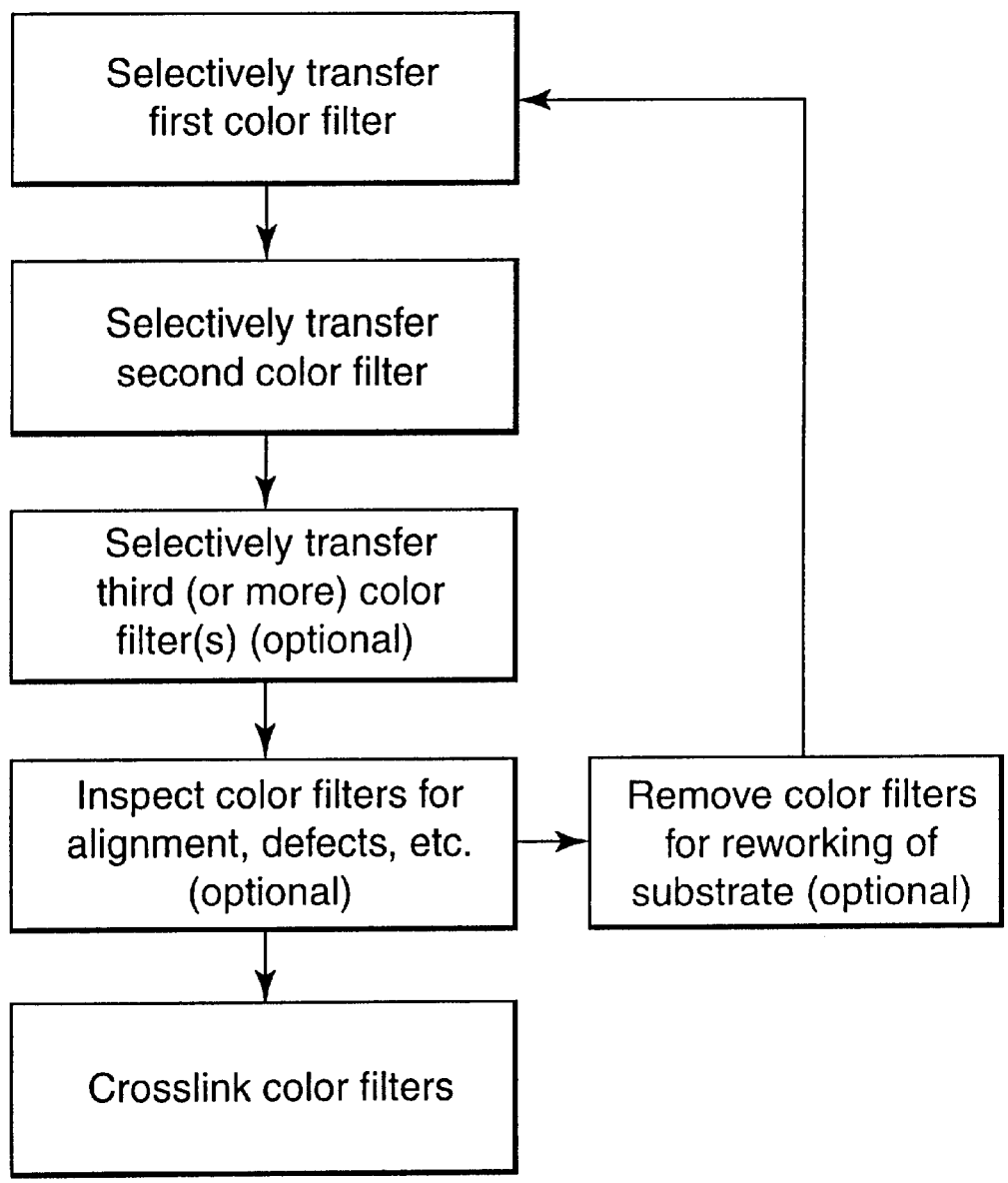
FIG. 3 is a schematic flow chart of steps in a method of the present invention.

FIG. 3 indicates steps for transferring multiple color filters to display substrates according to the present invention. A first color filter material can be selectively transferred to portions of a display substrate by thermal transferring a color filter material to the selected portions of the substrate. A second color filter material can similarly be selectively transferred to portions of the substrate. This procedure can optionally be repeated for a third (or more) color filter materials.

After selectively transferring two or more color filter materials, the color filters disposed on the active substrate can optionally be inspected for defects, alignment, and so forth. After an optional inspection, the color filters can be crosslinked, for example, by radiation curing, thermal curing, or exposure to chemical curatives. Crosslinking hardens the color filter material on the substrate, thereby making the color filters more chemically, physically, and/or thermally stable, and thus less susceptible to damage that can be caused by later processing or operation. However, crosslinking can also make removal of the color filter material more difficult. Therefore, prior to crosslinking and after an optional inspection, the present invention includes an alternative step of removing the color filters prior to crosslinking for reworking of the active substrate, as indicated in FIG. 3. The ability to successfully deposit multiple color filters before crosslinking or setting any one color filter provides the advantage that multiple color filters can be inspected at the same time, removed at the same time (if removal is necessary), and crosslinked at the same time.

Exemplary processes for selective thermal transferring of color filter materials include thermal mass transfer, ink jet printing, and colorant sublimation. Thermal mass transfer techniques include the imagewise transfer of color filter material from a donor sheet by selectively exposing the donor sheet to imaging radiation (e.g., from a laser or a flash lamp), and selective direct heating of portions of the donor sheet, for example by using a thermal print head or by direct resistance heating of a layer contacting or disposed in the donor element. Colorant sublimation techniques include selective dye sublimation from areas of a donor sheet. Ink jet techniques include forming a directed flow of a dye or pigment through an aperture or nozzle using heat or otherwise.

Methods for imagewise thermal mass transfer of color filter materials are discussed, for example, in U.S. Pat. Nos. 5,521,035 (Wolk) and 5,725,989 (Chang). Briefly, these processes involve thermally transferring material from selected areas of a color donor element sheet. Suitable donor elements are described in detail below. Heat can be generated using imaging radiation from a laser, flash lamp, or other suitable source to irradiate selected portions of a light-to-heat converter (LTHC) material in the donor element. The LTHC can be present as a separate layer in the donor media and/or included in other layers of the donor media, including in a color filter transfer layer.

During imaging, the color transfer layer of the donor element can be brought into intimate contact with a receptor (e.g., an active display substrate that has a plurality of devices, a passive display substrate that has one or more addressable electrodes, or other suitable display substrates). Pressure or vacuum can optionally be used to secure the donor element to the display substrate receptor. The radiation source can be used to heat the LTHC in an imagewise fashion (e.g., digitally, analog exposure through a mask, etc.) to cause imagewise transfer of portions of a color thermal transfer layer from the donor to the receptor. A variety of light-emitting sources can be utilized. Infrared, visible, and ultraviolet lasers are particularly useful when using digital imaging techniques. When analog techniques are used (e.g., exposure through a mask) high powered light sources (e.g., xenon flash lamps, etc.) are also useful.

During imaging, it may be desirable to minimize formation of interference patterns due to multiple reflections from the imaged material. This can be accomplished by various methods. A common method is to effectively roughen the surface of the donor element on the scale of the incident radiation as described in U.S. Pat. No. 5,089,372. This has the effect of disrupting the spatial coherence of the incident radiation, thus minimizing self interference. An alternate method is to employ an antireflection coating within the donor element. The general use of anti-reflection coatings is known, and may consist of quarter-wave thicknesses of a coating such as magnesium fluoride, as described in U.S. Pat No. 5,171,650.

Large donor elements can be used, including donor elements that have length and width dimensions of a meter or more. In operation, a laser can be rastered or otherwise moved across the donor element, the laser being selectively operated to illuminate portions of the donor element according to a desired pattern. Alternatively, the laser may be stationary and the donor element and/or receptor substrate moved beneath the laser.

In the present invention, it may be desirable and/or convenient to sequentially use two or more different color donor elements to form a plurality of color filters on a display substrate. Alternatively, a single donor element (e.g., one that has multiple different color filter materials patterned to form the color transfer layer) can be used to transfer multiple color filters from the donor element.

As an alternative to using imaging radiation, a heating element, such as a resistive heating element, may be used to selectively transfer portions of the color transfer layer. The donor element can be selectively contacted with a heating element to cause thermal transfer of a portion of the transfer layer according to a pattern. In another embodiment, the donor element may include a layer that can convert an electrical current applied to the layer into heat.

Ink jet printing can also be useful in selective thermal transfer of color filters to active display substrates. Methods for ink jet printing of color filters are described in U.S. Pat. Nos. 5,714,195 and 5,716,740. Exemplary color filter materials transferable using ink jet methods include an ink and a crosslinkable binder. The ink can include any suitable colorants such as dyes and pigments (as discussed above), and the ink can be liquid or solid. The binder can be any suitable binder that is ink compatible, examples of which include acrylic resins, epoxy resins, silicone resins, cellulose derivatives such as hydroxypropyl cellulose, hydroxyethyl cellulose, methyl cellulose, and carboxymethyl cellulose, and modified resins thereof. The color filter material can optionally include additives such as cure initiators, dispersing agents, surfactants, and other suitable additives.

For embodiments in which color filters are selectively thermally mass transferred from a donor element, suitable donor elements that can be used typically include a base substrate layer, a light-to-heat-converter (LTHC), a color transfer layer that includes a colorant dispersed in a crosslinkable composition, an optional interlayer disposed between the base layer and the color transfer layer, and an optional transfer assist layer.

The donor substrate can be a polymer film. One suitable type of polymer film is a polyester film, for example, polyethylene terephthalate or polyethylene naphthalate films. However, other films with sufficient optical properties (if light is used for heating and transfer), including high transmission of light at a particular wavelength, as well as sufficient mechanical and thermal stability for the particular application, can be used. The donor substrate, in at least some instances, is flat so that uniform coatings can be formed. The donor substrate is also typically selected from materials that remain stable despite heating of the LTHC during thermal transfer. The typical thickness of the donor substrate ranges from 0.025 to 0.15 mm, preferably 0.05 to 0.1 mm, although thicker or thinner donor substrates may be used.

Typically, the materials used to form the donor substrate and the LTHC layer are selected to improve adhesion between the LTHC layer and the donor substrate. An optional priming layer can be used to increase uniformity during the coating of subsequent layers and also increase the interlayer bonding strength between the LTHC layer and the donor substrate. One example of a suitable substrate with primer layer is available from Teijin Ltd. (Product No. HPE100, Osaka, Japan).

For radiation-induced thermal transfer, a separate LTHC layer is typically incorporated within the donor element to couple the energy of light radiated from a light-emitting source into the donor element. The LTHC layer preferably includes a radiation absorber that absorbs incident radiation (e.g., laser light) and converts at least a portion of the incident radiation into heat to enable transfer of the transfer layer from the donor element to the receptor. In some embodiments, there is no separate LTHC layer and, instead, the radiation absorber is disposed in another layer of the donor element, such as the donor substrate or the transfer layer. In other embodiments, the donor element includes an LTHC layer and also includes additional radiation absorber(s) disposed in one or more of the other layers of the donor element, such as, for example, the donor substrate or the transfer layer. In yet other embodiments, the donor element does not include an LTHC layer or radiation absorber and the transfer layer is transferred using a heating element that contacts the donor element.

Typically, the radiation absorber in the LTHC layer (or other layers) absorbs light in the infrared, visible, and/or ultraviolet regions of the electromagnetic spectrum and converts the absorbed radiation into heat. The radiation absorber is typically highly absorptive of the selected imaging radiation, providing a LTHC layer with an optical density at the wavelength of the imaging radiation in the range of about 0.2 to 3, or from about 0.5 to 2.5. (Optical density is the logarithm of the ratio of a) the intensity of light incident on the layer and b) the intensity of light transmitted through the layer.) Thicker coatings generally have higher optical densities, but may, at least in some instances, have less efficient heat transfer. Higher optical density LTHC layers may provide improved surface topography of the transferred layer (i.e., a smoother top surface), but may also result in increased edge roughness of the transferred layer.

Suitable radiation absorbing materials can include, for example, dyes (e.g., visible dyes, ultraviolet dyes, infrared dyes, fluorescent dyes, and radiation-polarizing dyes), pigments, metals, metal compounds, metal films, and other suitable absorbing materials. Examples of suitable radiation absorbers includes carbon black, metal oxides, and metal sulfides. One example of a suitable LTHC layer can include a pigment, such as carbon black, and a binder, such as an organic polymer. The amount of carbon black may range, for example, from 2 to 50 wt. % or 5 to 20 wt. %. High carbon black loadings may improve sensitivity and edge roughness of the transferred layer, but may also degrade the surface topography of the transferred color filter (e.g., due to excessive heating of the transfer layer during imaging). A suitable LTHC layer formulation is given in Table I.

TABLE I

LTHC Coating Formulation

| Component | Wt. % |
|---|---|
| Raven ™ 760 Ultra carbon black pigment (available from Columbian Chemicals, Atlanta, GA) | 8.0 |
| Butvar ™ B-98 (polyvinylbutyral resin, available from Monsanto, St. Louis, MO) | 1.4 |
| Joncryl ™ 67 (acrylic resin, available from S. C. Johnson & Son, Racine, WI) | 4.2 |
| Elvacite ™ 2669 (acrylic resin, available from ICI Acrylics, Wilmington, DE) | 31.8 |
| Disperbyk ™ 161 (dispersing aid, available from Byk Chemie, Walfingford, CT) | 0.7 |
| FC-430 ™ (fluorochemical surfactant, available from 3M, St. Paul, MN) | 0.03 |
| Ebecryl ™ 629 (epoxy novolac acrylate, available from UCB Radcure, N. Augusta, SC) | 47.6 |
| Irgacure ™ 369 (photocuring agent, available from Ciba Specialty Chemicals, Tarrytown, NY) | 5.3 |
| Irgacure ™ 184 (photocuring agent, available from Ciba Specialty Chemicals, Tarrytown, NY) | 0.8 |

In a particular embodiment, LTHC layers can be used that contain conductive materials dissipate charge built up during the process of coating layers to form the donor element. For example, LTHC layers can be used that contain carbon black in a binder that has ionic functional groups. LTHC layers so formulated that have conductivities of about $10^7$ Ω/square or more may provide adequate anti-static properties. An example of such a formulation includes components as shown in Table II.

TABLE II

LTHC Coating Formulation

| Material | Supplier | Function | Parts by weight |
|---|---|---|---|
| Ketjen Black EC600JD | Ketjen International | Carbon Black | 100.0 |
| Disperbyk 161 | BYK Chemie | Dispersant | 73.02 |
| UR8300 | Toyobo Co. | Binder | 500.4 |
| Evecryl EB629 | UCB Radcure, Inc. | Binder | 542.0 |
| Irgacure 369 | Ciba-Geigy | Initiator | 40.6 |
| Irgacure 184 | Ciba-Geigy | Initiator | 6.0 |

Another suitable LTHC layer includes metal or metal/metal oxide formed as a thin film, for example, black aluminum (i.e., a partially oxidized aluminum having a black visual appearance). Metallic and metal compound films may be formed by techniques, such as, for example, sputtering and evaporative deposition. Particulate coatings may be formed using a binder and any suitable dry or wet coating techniques.

Dyes suitable for use as radiation absorbers in a LTHC layer may be present in particulate form, dissolved in a binder material, or at least partially dispersed in a binder material. When dispersed particulate radiation absorbers are used, the particle size can be, at least in some instances, about 10 $\mu$m or less, and may be about 10 $\mu$m or less. Suitable dyes include those dyes that absorb in the IR region of the spectrum. Examples of such dyes may be found in Matsuoka, M., "Infrared Absorbing Materials", Plenum Press, New York, 1990; Matsuoka, M., *Absorption Spectra of Dyes for Diode Lasers,* Bunshin Publishing Co., Tokyo, 1990, U.S. Pat. Nos. 4,722,583; 4,833,124; 4,912,083; 4,942,141; 4,948,776; 4,948,778; 4,950,639; 4,940,640; 4,952,552; 5,023,229; 5,024,990; 5,156,938; 5,286,604; 5,340,699; 5,351,617; 5,360,694; and 5,401,607; European Patent Nos. 321,923 and 568,993; and Beilo, K. A. et al., *J. Chem. Soc., Chem. Commun.,*1993, 452–454 (1993). IR absorbers marketed by Glendale Protective Technologies, Inc., Lakeland, Fla., under the trade designation CYASORB IR-99, IR-126 and IR-165 may also be used. A specific dye may be chosen based on factors such as, solubility in, and compatibility with, a specific binder and/or coating solvent, as well as the wavelength range of absorption.

Pigmentary materials may also be used in the LTHC layer as radiation absorbers. Examples of suitable pigments include carbon black and graphite, as well as phthalocyanines, nickel dithiolenes, and other pigments described in U.S. Pat. Nos. 5,166,024 and 5,351,617. Additionally, black azo pigments based on copper or chromium complexes of, for example, pyrazolone yellow, dianisidine red, and nickel azo yellow can be useful. Inorganic pigments can also be used, including, for example, oxides and sulfides of metals such as aluminum, bismuth, tin, indium, zinc, titanium, chromium, molybdenum, tungsten, cobalt, iridium, nickel, palladium, platinum, copper, silver, gold, zirconium, iron, lead, and tellurium. Metal borides, carbides, nitrides, carbonitrides, bronze-structured oxides, and oxides structurally related to the bronze family (e.g., $WO_{2.9}$) may also be used.

Metal radiation absorbers may be used, either in the form of particles, as described for instance in U.S. Pat. No. 4,252,671, or as films, as disclosed in U.S. Pat. No. 5,256,506. Suitable metals include, for example, aluminum, bismuth, tin, indium, tellurium and zinc.

As indicated, a particulate radiation absorber may be disposed in a binder. The weight percent of the radiation absorber in the coating, excluding the solvent in the calculation of weight percent, is generally from 1 wt. % to 30 wt. %, preferably from 3 wt. % to 20 wt. %, and most preferably from 5 wt. % to 15 wt. %, depending on the particular radiation absorber(s) and binder(s) used in the LTHC.

Suitable binders for use in the LTHC layer include film-forming polymers, such as, for example, phenolic resins (e.g., novolak and resole resins), polyvinyl butyral resins, polyvinyl acetates, polyvinyl acetals, polyvinylidene chlorides, polyacrylates, cellulosic ethers and esters, nitrocelluloses, polycarbonates, and acrylic and methacrylic co-polymers. Suitable binders may include monomers, oligomers, or polymers that have been or can be polymerized or crosslinked. In some embodiments, the binder is primarily formed using a coating of crosslinkable monomers and/or oligomers with optional polymer. When a polymer is used in the binder, the binder includes 1 to 50% polymer by non-volatile weight, preferably, 10 to 45% polymer by non-volatile weight.

Upon coating on the donor substrate, the monomers, oligomers, and polymers are crosslinked to form the LTHC. In some instances, if crosslinking of the LTHC layer is too low, the LTHC layer may be damaged by the heat and/or permit the transfer of a portion of the LTHC layer to the receptor with the transfer layer.

The inclusion of a thermoplastic resin (e.g., polymer) may improve, in at least some instances, the performance (e.g., transfer properties and/or coatability) of the LTHC layer. It is thought that a thermoplastic resin may improve the adhesion of the LTHC layer to the donor substrate. In one embodiment, the binder includes 25 to 50% thermoplastic resin by non-volatile weight, and, preferably, 30 to 45% thermoplastic resin by non-volatile weight, although lower amounts of thermoplastic resin may be used (e.g., 1 to 15 wt. %). The thermoplastic resin is typically chosen to be compatible (i.e., form a one-phase combination) with the other materials of the binder. A solubility parameter can be used to indicate compatibility, *Polymer Handbook,* J. Brandrup, ed., pp. VII 519–557 (1989). In at least some embodiments, a thermoplastic resin that has a solubility parameter in the range of 9 to 13 $(cal/cm^3)^{1/2}$, preferably, 9.5 to 12 $(cal/cm^3)^{1/2}$, is chosen for the binder. Examples of suitable thermoplastic resins include polyacrylics, styrene-acrylic polymers and resins, and polyvinyl butyral.

Conventional coating aids, such as surfactants and dispersing agents, may be added to facilitate the coating process. The LTHC layer may be coated onto the donor substrate using a variety of coating methods known in the art. A polymeric or organic LTHC layer is coated, in at least some instances, to a thickness of 0.05 $\mu$m to 20 $\mu$m, preferably, 0.5 $\mu$m to 10 $\mu$m, and, more preferably, 1 $\mu$m to 7 $\mu$m. An inorganic LTHC layer is coated, in at least some instances, to a thickness in the range of 0.001 to 10 $\mu$m, and preferably, 0.002 to 1 $\mu$m.

An optional interlayer may be disposed in the donor element between the donor substrate and the transfer layer to minimize damage and contamination of the transferred portion of the transfer layer and to reduce distortion in the transferred portion of the transfer layer. The interlayer may also influence the adhesion of the transfer layer to the rest of the donor element. Typically, the interlayer has high thermal resistance. The interlayer typically remains in contact with the LTHC layer during the transfer process and is not substantially transferred with the transfer layer.

Suitable interlayers include, for example, polymer films, metal layers (e.g., vapor deposited metal layers), inorganic layers (e.g., sol-gel deposited layers and vapor deposited layers of inorganic oxides (e.g., silica, titania, and other metal oxides)), and organic/inorganic composite layers. Organic materials suitable as interlayer materials include both thermoset and thermoplastic materials, and are preferably coated on the donor element between the LTHC layer and the transfer layer. Coated interlayers can be formed by conventional coating processes such as solvent coating, extrusion coating, gravure coating, and the like. Suitable thermoset materials include resins that may be crosslinked by heat, radiation, or chemical treatment including, but not limited to, crosslinked or crosslinkable polyacrylates, polymethacrylates, polyesters, epoxies, polyurethanes, and acrylate and methacrylate co-polymers. The thermoset materials may be coated onto the LTHC layer as, for example, thermoplastic precursors and subsequently crosslinked to form a crosslinked interlayer.

Suitable thermoplastic materials include, for example, polyacrylates, polymethacrylates, polystyrenes, polyurethanes, polysulfones, polyesters, and polyimides. These thermoplastic organic materials may be applied via conventional coating techniques (for example, solvent coating, spray coating, or extrusion coating). Typically, the glass transition temperature ($T_g$) of thermoplastic materials suitable for use in the interlayer is about 25° C. or greater, preferably 50° C. or greater, more preferably 100° C. or greater, and even more preferably 150° C. or greater. In an exemplary embodiment, the interlayer has a $T_g$ that is greater that a temperature attained in the transfer layer during imaging. The interlayer may be either transmissive, absorbing, reflective, or some combination thereof, at the imaging radiation wavelength.

Inorganic materials suitable as interlayer materials include, for example, metals, metal oxides, metal sulfides, and inorganic carbon coatings, including those materials that are highly transmissive or reflective at the imaging light wavelength. These materials may be applied to the light-to-heat-conversion layer via conventional techniques (e.g., vacuum sputtering, vacuum evaporation, or plasma jet deposition).

The interlayer may provide a number of benefits. The interlayer may be a barrier against the transfer of material from the LTHC layer. It may also modulate the temperature attained in the transfer layer so that thermally unstable materials can be transferred. For example, the interlayer can act as a thermal diffuser to control the temperature at the interface between the interlayer and the transfer layer relative to the temperature attained in the LTHC layer. This can improve the quality (i.e., surface roughness, edge roughness, etc.) of the transferred layer.

The interlayer may contain additives, including, for example, photoinitiators, surfactants, pigments, plasticizers, and coating aids. The thickness of the interlayer may depend on factors such as, for example, the material of the interlayer, the material of the LTHC layer, the material of the transfer layer, the wavelength of the imaging radiation, and the duration of exposure of the donor element to imaging radiation. For polymer interlayers, the thickness of the interlayer typically is in the range of 0.05 μm to 10 μm, preferably, from about 0.1 μm to 4 μtm, more preferably, 0.5 to 3 μm, and, most preferably, 0.8 to 2 μm. For inorganic interlayers (e.g., metal or metal compound interlayers), the thickness of the interlayer typically is in the range of 0.005 μm to 10 μm, preferably, from about 0.01 μm to 3 μm, and, more preferably, from about 0.02 to 1 μm.

Table III indicates an exemplary solution for coating an interlayer.

TABLE III

Interlayer Formulation

| Component | Parts by Weight |
| --- | --- |
| Butvar ™ B-98 (polyvinylbutyral resin, available from Monsanto, St. Louis, MO) | 0.98 |
| Joncryl ™ 67 (acrylic resin, available from S. C. Johnson & Son, Racine, WI) | 2.95 |
| Sartomer ™ SR351 ™ (trimethylolpropane triacrylate, available from Sartomer, Exton, PA) | 15.75 |
| Irgacure ™ 369 (photocuring agent, available from Ciba Specialty Chemicals, Tarrytown, NY) | 1.38 |
| Irgacure ™ 184 (photocuring agent, available from Ciba Specialty Chemicals, Tarrytown, NY) | 0.2 |
| 1-methoxy-2-propanol | 31.5 |
| methyl ethyl ketone | 47.24 |

The transfer layer, or colorant layer, of the donor element can include an organic or inorganic colorant in an organic or inorganic crosslinkable composition. The colorant generally includes pigments, dyes, or inks, generally disposed in a binder. The transfer layer can optionally include a surfactant and other additives. Other additives may also be included such as an IR absorber, dispersing agents, surfactants, stabilizers, plasticizers, crosslinking agents and coating aids. The colorant layer may also contain a variety of additives including but not limited to dyes, plasticizers, UV stabilizers, film forming additives, and adhesives. Suitable dispersing resins include vinyl chloride/vinyl acetate copolymers, poly(vinyl acetate)/crotonic acid copolymers, polyurethanes, styrene maleic anhydride half ester resins, (meth)acrylate polymers and copolymers, poly(vinyl acetals), poly(vinyl acetals) modified with anhydrides and amines, hydroxy alkyl cellulose resins and styrene acrylic resins. An exemplary color transfer layer composition comprises 5–80% by weight colorant, 15–95% by weight resin, and 0–80% by weight crosslinking agent, dispersing agents, and additives.

Exemplary pigments and dyes include those listed as having good color permanency and transparency in the NPIRI Raw Materials Data Handbook, Volume 4 (Pigments). Examples of suitable transparent colorants include Ciba-Geigy Cromophtal Red A2B™, Dainich-Seika ECY-204™, Zeneca Monastral Green 6Y-CL™, and BASF Heliogen Blue L6700F™. Other suitable transparent colorants include Sun RS Magenta 234–007™, Hoechst GS Yellow GG 11-1200™, Sun GS Cyan 249–0592™, Sun RS Cyan 248–061, Ciba-Geigy BS Magenta RT-333D™, Ciba-Geigy Microlith Yellow 3G-WA™, Ciba-Geigy Microlith Yellow 2R-WA™, Ciba-Geigy Microlith Blue YG-WA™, Ciba-Geigy Microlith Black CWA™, Ciba-Geigy Microlith Violet RL-WA™, Ciba-Geigy Microlith Red RBS-WA™, any of the Heucotech Aquis II™ series, any of the Heucosperse Aquis III™ series, and the like. Another class of pigments than can be used for color filter materials in the present invention are various latent pigments such as those available from Ciba-Geigy.

Either non-aqueous or aqueous dispersions of a colorant in a binder may be used. In the non-aqueous case, solvent-based colorant dispersions may be used along with an appropriate solvent based binder (i.e. Elvacite™ acrylic resins available from ICI Chemicals). It can often be useful to employ an aqueous dispersion of colorant in binder. In this case, exemplary colorants include pigments in the form of binderless aqueous dispersions (i.e. Aquis II™ supplied by Heucotech) and exemplary binders include those specifically designed for pigment wetting (i.e. Neocryl BT™ acrylic resins from Zeneca Resins). The use of appropriate binders can promote the formation of sharp, well defined edges of the color filters during transfer. When the colorant transfer is induced by a high powered light source (i.e., xenon flash lamp), it may be helpful to include as a binder ax energetic or gas producing polymer such as disclosed in U.S. Pat. Nos. 5,308,737 and 5,278,023.

The binder system includes organic and/or inorganic polymerizable and/or crosslinkable materials (i.e., monomers, oligomers, prepolymers, and/or polymers), and optionally an initiator system. Using monomers or oligomers can assist in reducing binder cohesive forces in the transfer layer, therefore improving imaging sensitivity and/or transferred image resolution.

The colors used to form the color filters are generally primary additive colors (i.e. red, green, and blue), and can also be primary subtractive color (e.g., cyan, magenta, and yellow). Each of these primary colors can have high color purity and transmittance, and, when combined, an appropriate white balance. For use in full color liquid crystal displays, exemplary color filters can have spectral characteristics of red, green, and blue, for example, that show chromaticity close to the National Television Standards Committee (NTSC) standard colors indicated by the Commission International de l'Eclairage (CIE) chromaticity diagram.

The optional transfer assist layer is typically a layer of adhesive coated as the outermost layer of the donor sheet. The adhesive serves to promote complete transfer of the colorant, especially during the separation of the donor from the receptor substrate after imaging. Exemplary transfer assist layers include colorless, transparent materials with a slight tack or no tack at room temperature, such as the family of resins sold by ICI Chemicals under the trade designation Elvacite™ (e.g., Elvacite™ 2776). Transfer assist layers can also be optionally disposed on the receptor.

Referring again to FIG. 3, after transferring multiple color filters to a display substrate and prior to crosslinking the transferred color filters, the color filters can be inspected for proper alignment, undesired defects, and the like. Inspection can take place using any suitable method of inspection. After an optional inspection and prior to crosslinking, the color filters can be removed for reworking of the display substrate. Removal of the color filters can be performed in any suitable manner. Typically, the color filters are removed before crosslinking by contact with a washing solution in which the color filter material is soluble. The color filters can be contacted with any suitable washing solution using any suitable method including spraying, immersing, and wiping. The particular washing solution used generally depends on the material of the binder and colorant in the color filter layer. For example, washing solutions suitable for removing some acrylate-based color filters prior to crosslinking include dilute ammonia, sodium hydroxide, various alcohols and ketones, and other such suitable solvents.

Removal of the color filters for reworking of the substrate can be particularly advantageous when using active display substrates. Active display substrates have a plurality of devices and can be a relatively expensive component in the display. Thus, the ability to rework an active substrate after removal of color filters can limit waste and reduce costs.

Referring again to FIG. 1, active layer 214 is commonly provided on bottom substrate 212 as shown. In other embodiments, active layer 214 can be provided on top substrate 226. For the sake of clarity, the active layer has been described throughout this document as being disposed on the bottom substrate; however, it is understood that the provision of an active layer on either or both substrates is contemplated in the present invention.

In general, active layer 214 includes a plurality of addressable devices, such as thin film transistors, and a plurality of address lines electrically connected to the devices. FIGS. 2(a) and (b) show a particular embodiment where thin film transistors 20 are arranged in a rectangular array, are addressed by address lines 32 and 34, and are connected to sub-pixel electrodes 12. The sub-pixel electrodes are typically made from a transparent conductive material, and each electrode typically covers an area that corresponds to a sub-pixel in the display. An exemplary transparent conductive material is indium tin oxide (ITO). Each pixel or sub-pixel of the display is preferably provided with one or more active devices, and may also be provided with one or more passive devices, such as capacitors, resistors, and the like. For example, capacitors can be added to sustain an address signal for a longer period of time so that the pixels can be refreshed less often. This can help increase the overall speed and brightness of the display.

Active layers can optionally include a black matrix to enhance contrast in the overall display by providing lines of relatively high optical density (and preferably relatively low surface reflectivity) that separate pixels or sub-pixels and/or that protect the active devices from undesired light-induced activation. The black matrix can be disposed between the active layer and the substrate, within the active layer, or between the active layer and the liquid crystal layer. One embodiment is shown in FIG. 2(b) where black matrix 50 is disposed on the active layer. Whereas the address lines can be used as a black matrix, a higher optical density and lower surface reflectivity can often be obtained by depositing a separate black matrix material.

Examples of suitable black matrix materials include metals, such as chromium, provided as a layer or as particles in a binder; metal oxides, nitrides, sulfides, and the like, including chromium oxides, aluminum oxides, and others provided as a layer or as particles in a binder; other opaque inorganic materials provided as a layer or as particles in a binder; and organic materials such as carbon black, dark pigments or dyes, or other black colorants disposed in a binder. An exemplary black matrix has on optical density that is greater than 2, and preferably greater than 2.5.

A black matrix can be provided on an active substrate using any suitable method. For example, conventional photolithography techniques can be used to pattern black matrix on the active substrate. Black matrix materials can also be directly patterned on the substrate by deposition through a mask or by various conventional printing methods including thermal print head and ink jet methods. An exemplary method of patterning black matrix on active substrates is by selective thermal mass transfer of black matrix material from a donor element to the active substrate by selectively exposing the donor element to imaging radiation such as from a laser or a flash lamp, as discussed in more detail below.

When black matrix material is disposed adjacent to active layers on active substrates, it may be desirable for the material to combine the advantages of a high optical density (i.e., 2 or greater) using a relatively thin coating while having a high resistivity (i.e., $1 \times 10^{10}$ ohm-cm or greater) that substantially prevents crosstalk between adjacent devices through the black matrix. Crosstalk is an undesired leakage of current or inducement of a signal voltage between devices or electrodes. Various metal oxides, nitrides, sulfides, etc. can be used that provide the benefits of high optical density and high resistivity. An exemplary organic black matrix material that has high optical density and high resistivity and that is suitable for use on active display substrates is disclosed in co-filed and co-pending U.S. patent application Ser. No. 09/312,421 (corresponding to attorney docket no. 54738USA7A, entitled "Thermal Transfer of a Black Matrix Containing Carbon Black"). The black matrix material there disclosed can be especially useful when constructing thin displays because a thin black matrix can be formed using organic material while maintaining a high optical density and high resistivity.

An exemplary method of patterning a black matrix onto display substrates for active displays includes selective thermal mass transfer of a black matrix material from a donor element. The donor element can be heated by the application of directed heat on selected portions of the donor element. Heat can be generated by using a heating element, converting radiation (e.g., light) to heat, and/or applying an electrical current to a layer of the donor element. In many instances, thermal transfer using light from, for example, a lamp or laser, is advantageous because of the accuracy and precision that can often be achieved. Imagewise transfer of material from the donor element to a receptor can be achieved by placing a radiation absorber in the donor element and selectively radiating the donor element, for example, using a directed laser beam or a flash lamp shined through a mask. To effect transfer of material from the donor to the receptor, imaging radiation can generally be directed through the donor element. In some instances, it may be desirable to direct imaging radiation through the receptor.

Donor elements suitable for transferring black matrix material are similar to donor elements suitable for selective thermal mass transfer of color filter material as described above. Exemplary donor element constructions for transferring black matrix materials are disclosed in co-filed and co-pending U.S. patent application Ser. No. 09/312,421 (corresponding to attorney docket no. 54738USA7A entitled "Thermal Transfer of a Black Matrix Containing Carbon Black"). One suitable donor element construction includes a polyester film substrate that has an optional primer layer, an LTHC layer, a temperature modulation interlayer, and a black matrix transfer layer. Another suitable donor element has a two-layer construction including a base film and a transferable layer of black matrix material coated on the base film. The transferable layer can function as an LTHC layer in this construction.

Referring again to FIG. 2(b), a planarization layer 16 can also be included on the active substrate 10a. Due to the many components disposed on the active substrate, the surface profile of the active substrate tends to be non-uniform. Without a planarization layer, the non-uniform surface profile can lead to non-uniform spacings between the top and bottom substrate. Non-uniform spacings can undesirably affect liquid crystal performance and lead to non-uniform display characteristics. The planarization layer can be used to provide a substantially planar surface so that a uniform gap between substrates can be maintained. Planarization layer materials are preferably non-birefringent and substantially transparent to light so that the display performance is not adversely affected. Suitable planarization layer material include various planarization layer and overcoat materials known in the art such as the overcoat materials for LCD panel construction commercially available from JSR Corporation, Yokkaichi, Japan.

In a particular embodiment, when the sub-pixel electrodes 12 are formed on the planarization layer 16 as in FIG. 2(b), through holes 28 can be formed in the intermediate layers, such as the planarization layer 16 and color filters R, G, and B, so that electrical contact can be made between the sub-pixel electrodes 12 and the drain electrodes 26 of transistors 20. Through holes can be made using any suitable technique such as etching (e.g., using an etch mask to define through hole positions) or laser ablation. An exemplary method involves coating a photoresist material over the color filters and planarization layer, photolithographically creating holes in the resist coating in the positions where the through holes are to be formed, and etching the exposed portions of the planarization layer and color filters to form through holes for connecting the sub-pixel electrodes to the drain electrodes. The photoresist mask can then be removed.

Another method involves patterning a curable photoresist planarization layer to also act as a through hole etch mask. In this way, the portions of the color filters exposed by the patterned holes in the planarization layer/etch mask can be etched to complete the through holes. The photoresist coating can remain after etching to form the planarization layer.

In one embodiment, color filter formulations suitable for use with through hole etching processes include those that have a colorant dispersed in a binder that is soluble in solvents compatible with active matrix display substrates. Examples include color filter materials that have a colorant dispersed in an alkali soluble resin and a water soluble thermal crosslinker. The alkali soluble resin can include an acrylic copolymer that contains an acrylic acid unit or a methacrylic acid unit, and the crosslinker can include a water soluble melamine resin. Illustrative formulations of alkali soluble color filter materials for red, green, and blue color filters are given in Table IV.

TABLE IV

Alkali Soluble Color Filter Formulations

| Material | Source | Function | Parts by weight |
|---|---|---|---|
| Red Color Filter Material | | | |
| Cromophtal Red A2B | Ciba-Geigy | red pigment | 80 |
| ECY-204 | Dainich-Seika | yellow pigment | 20 |
| Disperbyk 161 | BYK-Chemie | dispersant | 18.4 |
| Elvacite 2669 | ICI | acrylic resin | 134.3 |
| Cymel 370 | Mitsui Cytec | crosslinker | 80.6 |
| Green Color Filter Material | | | |
| Monastral Green 6Y-CL | Zeneca | green pigment | 80 |
| ECY-204 | Dainich-Seika | yellow pigment | 20 |
| Disperbyk 161 | BYK-Chemie | dispersant | 17.4 |
| Elvacite 2669 | ICI | acrylic resin | 121.9 |
| Cymel 370 | Mitsui Cytec | crosslinker | 73.2 |
| Blue Color Filter Material | | | |
| Heliogen Blue L6700F | BASF | blue pigment | 100 |
| Disperbyk 161 | BYK-Chemie | dispersant | 15 |
| Elvacite 2669 | ICI | acrylic resin | 178.1 |
| Cymel 370 | Mitsui Cytec | crosslinker | 106.9 |

Referring again to FIGS. 2(a) and (b), transparent sub-pixel electrodes 12 can be any suitable conductive material that is substantially transparent to light, and can be patterned using any suitable patterning method such as conventional photolithography and/or sputter deposition through a mask. Various transparent conductive oxides can be used, typically indium tin oxide (ITO). For application of a uniform electric field through the sub-pixel area defined by a sub-pixel electrode, the electrode is preferably formed on a substantially flat surface. For example, the sub-pixel electrodes can be formed directly on the bottom substrate or directly on a planarization layer or other layer. FIG. 2(b) shows transparent sub-pixel electrodes 12 formed on planarization layer 16.

In a particular embodiment, the liquid crystal material in a display of the present invention can be selected to improve display performance. Referring again to FIG. 1, liquid crystal layer 220 can contain any liquid crystal material or mixture of liquid crystal materials suitable for electronic display device applications. Commonly used liquid crystal materials include nematic, chiral nematic, and ferroelectric liquid crystals. In general, these materials are classified according to their mode of operation, which includes their orientation in a display and behavior upon application of an electric field.

Some liquid crystal materials are oriented to wind and unwind in the plane of the liquid crystal layer. The rotation of the liquid crystal material causes the polarization of transmitted light to rotate as it passes through the liquid crystal. Application of an electric field changes the rotation of the liquid crystal material so that light rays transmitted through activated pixel areas have differently oriented polarizations than those transmitted through non-activated pixel areas. Some liquid crystal materials are oriented so that their molecules tilt along the surface of a cone whose symmetry axis lies in the plane of the liquid crystal layer. Upon application of an electric field, the liquid crystal molecules tilt along the surface of the cone. The orientation of the molecules controls the polarization of light transmitted.

The modes of liquid crystal displays that are most extensively employed at the present time are twisted nematic (TN), supertwisted birefringence effect (SBE), and dynamic scattering (DS), all employing nematic or chiral nematic (cholesteric) liquid crystals. These devices are based upon the dielectric alignment effects of the nematic and/or chiral nematic liquid crystal (or mixtures of nematic or chiral nematic liquid crystals) upon application of an electric field. The average molecular long axis of the liquid crystal material takes up a preferred orientation in the applied electric field, the orientation of which is dependent on the sign of the dielectric anisotropy of the material or mixture, and this orientation relaxes upon removal of the applied electric field. This reorientation and relaxation is slow, on the order of a few milliseconds.

Although nematic and chiral nematic liquid crystals are the most extensively employed, there are liquid crystal devices that employ more highly ordered smectic liquid crystals. These devices are also based on the dielectric reorientation of the liquid crystals, and response times are on the order of milliseconds. A recent advance in the liquid crystal art has been the utilization of tilted chiral smectic liquid crystals, which are also termed ferroelectric liquid crystals (FLC), in devices which give microsecond switching. Accordingly, displays of the present invention can employ FLC material to obtain faster switching speeds. FLC materials properly aligned in a liquid crystal display can exhibit bistability and symmetric switching characteristics, which can lead to reduced power consumption, as discussed in more detail below with regard to alignment layers.

In a particular embodiment, displays of the present invention can include FLC materials and mixtures thereof. In some embodiments, the liquid crystal material can contain fluorinated chiral FLC compositions. Particularly suited fluorine-containing FLC materials that have recently been developed include those disclosed in U.S. Pat. Nos. 4,886,619; 5,082,587; and 5,262,082.

FLC development has been hindered by problems with defects in the liquid crystal layer structure. These defects arise due to layer shrinkage upon cooling (through the temperature ranges associated with the tilted smectic mesophases) and the resulting formation of a "chevron" layer structure (see, e.g., the discussion by T. P. Rieker et al. in *Phys. Rev. Lett.* 59, 2658 (1987) and *Ferroelectrics* 113, 245 (1991), as well as the discussion by Y. Ouchi et al. in *Jpn. J Appl. Phys.* 27, L1993 (1988)). The defects and chevron layer structure often result in a poor contrast ratio and unstable bistability.

To minimize these defects, admixtures of liquid crystal compounds that contract upon cooling through at least one tilted smectic mesophase (positive compounds) and liquid crystal compounds that expand upon cooling through at least one tilted smectic mesophase (negative compounds) can be prepared to control the liquid crystal layer expansion or contraction behavior, as disclosed in U.S. Pat. No. 5,417,883. Such mixtures can be used to effect an essentially temperature-independent layer spacing in the tilted smectic mesophase(s), as well as a reduced temperature dependence of the layer spacing in the temperature range associated with the transition between the non-tilted and the tilted mesophases. The process of proper admixing of liquid crystal compounds to yield a mixture that has complementary expansion and contraction behavior enables control of layer spacing in the tilted smectic mesophase(s) and thereby control or suppression of chevron layer geometry. Such suppression reduces or eliminates the formation of zig-zag alignment defects upon cooling through the tilted smectic mesophase(s), resulting in improved electooptical switching performance, increased memory to driven cone-tilt angle ratios, and improved contrast ratios. The process also enables the reduction or elimination of the stress-induced defects and non-bookshelf layer geometry which result from heating and cooling cycles.

Preferred smectic or latent smectic liquid crystal compounds which can be utilized in the negative compositions are chiral or achiral liquid crystal compounds which have at least one fluorinated terminal portion and which exhibit negative thermal layer expansion behavior in at least one tilted (or latent tilted) smectic mesophase. A preferred class of such compounds is that class of chiral or achiral liquid crystal compounds which have at least one fluoroether terminal portion containing at least two catenary, i.e., in-chain, ether oxygen atoms and which exhibit negative thermal layer expansion behavior. Such compounds can comprise, e.g., (a) an aliphatic fluorocarbon terminal portion containing at least two catenary ether oxygen atoms; (b) an aliphatic hydrocarbon terminal portion; and (c) a central core connecting the terminal portions. The aliphatic hydrocarbon terminal portion of the compounds can be either chiral or achiral. (Such achiral compounds are described in U.S. Pat. No. 5,262,082 to Janulis et al.)

Another preferred class of liquid crystal compounds which have at least one fluorinated terminal portion and which can be utilized in the negative compositions are those smectic or latent smectic, chiral or achiral liquid crystal compounds which have at least one fluoroaliphatic terminal portion (e.g., the compounds described in U.S. Pat. No. 4,886,619 and U.S. Pat. No. 5,082,587 and which exhibit negative thermal layer expansion behavior in at least one tilted (or latent tilted) smectic mesophase. For example, 5-hexyl-2-(4'-1,1-dihydroperfluorooctyloxy) phenylpyrimidine has been found to exhibit such behavior and to be suitable for such use.

Other liquid crystal compounds which possess a mechanism which offsets the layer shrinkage associated with the tilting of the molecules in at least one tilted (or latent tilted) smectic mesophase and which thereby exhibit negative thermal expansion behavior in the mesophase(s) can also be utilized in the negative compositions.

Liquid crystal compositions suitable for use in admixture with the above-described negative compositions are those compositions which have a net positive thermal layer expansion in at least one tilted (or latent tilted) smectic mesophase and which comprise at least one smectic or latent smectic liquid crystal compound. Smectic (or latent smectic) liquid crystal compounds suitable for inclusion in the liquid crystal compositions having net positive thermal expansion behavior (hereinafter termed "positive compositions") include chiral and achiral liquid crystal compounds which have aliphatic terminal portions and which exhibit positive thermal layer expansion behavior in at least one tilted (or latent tilted) smectic mesophase, e.g., compounds such as the alkyl, alkoxy phenylpyrimidines and the alkoxy, alkoxy phenylbenzoates described by D. Demus et al., *Flussige Kristalle in Tabellen, VEB Deutscher Verlag fur Grundstoffirdustrie*, pages 65–76 and 260–63, Leipzig (1974) and by S. Kumar, *Phys. Rev.* A 23, 3207 (1984); chiral and achiral liquid crystal compounds which have at least one fluoroaliphatic terminal portion (such compounds are described, e.g., in U.S. Pat. No. 4,886,619 and U.S. Pat. No. 5,082,587) and which exhibit positive thermal layer expansion behavior in at least one tilted (or latent tilted) smectic mesophase; and chiral and achiral liquid crystal compounds which have at least one fluoroether terminal portion containing only one catenary ether oxygen atom and which exhibit positive thermal layer expansion behavior in at least one tilted (or latent tilted) smectic mesophase. The latter compounds can be, e.g., compounds which comprise (a) an aliphatic fluorocarbon terminal portion containing one catenary ether oxygen atom; (b) an aliphatic hydrocarbon terminal portion; and (c) a central core connecting the terminal portions.

When compound(s) that have a fluoroether terminal portion containing at least two catenary ether oxygen atoms are used as the major component(s) of the negative compositions, the compositions can preferably be combined with positive compositions comprising (as the major component(s)) at least one chiral or achiral liquid crystal compound having a fluoroaliphatic terminal portion or, more preferably, a fluoroether terminal portion containing only one catenary ether oxygen atom. Such combinations are preferred from the standpoint of compatibility.

An important characteristics of a liquid crystal display device is its response time, i.e., the time required for the device to switch from the on (light) state to the off (dark) state. In a ferroelectric or anti-ferroelectric device, response time is proportional to the rotational viscosity of the liquid crystal compound(s) contained within the device and is inversely proportional to their polarization and to the applied electric field. Thus, response time can be reduced by using compound(s) having high polarizations or low viscosities. Briefly, liquid crystal materials suitable for use in this invention and that provide fast response times include fluorine-containing, chiral liquid crystal compounds having smectic mesophases or latent smectic mesophases. (Compounds having latent smectic mesophases are those which by themselves do not exhibit a smectic mesophase, but which, when in admixture with compounds having smectic mesophases or with other compounds having latent smectic mesophases, develop smectic mesophases under appropriate conditions.) Chiral liquid crystal compounds that provide fast response times include those materials described in the following U.S. Pat. Nos.: 5,855,812; 5,702,637; 5,658,491; 5,482,650; 5,474,705; 5,437,812; 5,417,883; 5,399,291; 5,377,033; 5,262,082; 5,254,747; 5,082,587; 5,062,691; and 4,886,619.

Another advantage that can be obtained from using suitable liquid crystal mixtures as described above in displays of the present invention is a low birefringence. The low birefringence of these fluorine-containing liquid crystal compounds (relative to their nonfluorine-containing analoques) allows the fabrication of devices with somewhat larger device spacings without substantial loss of light transmission. Light transmission through, e.g., a surface-stabilized ferroelectric device (as described in U.S. Pat. No. 4,367,924) with two polarizers is represented by the following equation:

$$I = I_o (\sin^2(4\Theta)) (\sin^2 (\pi \Delta n d/\lambda))$$

where 10 is the transmission through parallel polarizers, $\Theta$ is the liquid crystal material tilt angle, $\Delta n$ is the liquid crystal birefringence, d is the device spacing, and X is the wavelength of light used. To maximize the transmission, both $\sin^2 (4\Theta)$ and $\sin^2 (\pi \Delta n d/\lambda)$ should be at maximized. This occurs when each term equals one. The first term is a maximum when the tilt angle equals 22.5°. This is a function of the liquid crystal and is constant for a given material at a given temperature. The second term is maximum when $\Delta n d = k/2$. This demonstrates the criticality of the low birefringence of the materials of this invention. Low birefringence allows a larger device thickness, d, for a given wavelength of light. Thus, a larger device spacing is possible while still maximizing transmission, allowing easier device construction.

Referring again to FIG. 1, alignment layers 218 and 222 can be applied to portions of the interior surfaces of the substrate elements of the display to cause a desired orientation of the liquid crystal material at the interface of the liquid crystal layer 220. Proper alignment of the liquid crystal molecules allows light to be rotated through angles that are complementary to the alignment of the polarizers associated with the cell. The particular alignment layers used commonly depends on the type of liquid crystal material used. Examples of alignment layer materials include certain polyimides, polyamides, polyesters, polysiloxanes, nylon copolymers, organosilsequioxane polymers, and other suitable polymers capable of being disposed on a display substrate and oriented for alignment. Inorganic alignment layers, such as silicon oxides, can also be used. A common method of orienting polymeric alignment coatings is by a physical rubbing process. Alignment layers 218 and 222 can be the same or different materials that provide symmetric or asymmetric alignment. Particularly useful asymmetric alignment schemes are described in U.S. Pat. Nos. 5,377,033 and 5,831,705.

When FLC materials are used, alignment layer schemes that provide the FLC layer with good bistability and symmetric switching characteristics can result in displays that have lower power consumption. Good bistability and symmetric switching potentials can reduce the need for frequent pixel resetting and/or depolarization due to charge build up. An alignment layer scheme that may be suitable for these purposes is disclosed in U.S. Pat. No. 5,831,705, which is wholly incorporated into this document.

In a particular embodiment, displays of the present invention include spacers selected to improve overall display performance. Referring again to FIG. 1, spacers (not shown) can be provided in the liquid crystal layer 220 to maintain a desired gap between the top substrate 226 and bottom substrate 212. For example, FIG. 2(b) shows spacers 42 disposed in liquid crystal layer 40 to maintain a gap between top substrate 10b and bottom substrate 10a. Control of the spacings and mechanical forces within the construction of a flat panel display can often be critical to the performance of the device, and can depend upon the incorporation of physical spacers into the display. In liquid crystal displays (LCDs), the polarization of the light exiting the display is controlled in part by the optical path length through the liquid crystal layer. In current display technology, the thickness of the liquid crystal layer is determined by spacers, which may be in the form of particles (i.e., spherical beads or fibers), columnar structures (i.e., posts or pillars), microribs, etc.

A common method for controlling the thickness of the liquid crystal layer is to deposit a random arrangement of particles having a narrow size distribution over the entire surface of the substrate or alignment layer. This process has an obvious disadvantage in that there is no control over the placement of the particles resulting in a high percentage of the particles appearing in the display windows, thus decreasing the amount of light that may pass through the display. In many applications, the particles are not anchored to the substrate and may shift or migrate causing artifacts to appear in those areas in the display cell. To prevent particle migration, the opposing display substrates are commonly compressed so that the smaller spacer particles become pinned. Generally, thicker glass substrates are preferred to withstand the compression step and to resist local deformation from the larger spacer particles that are stressed during compression.

Spacers can also be selectively placed in desired locations between substrate elements in a liquid crystal display, for example by photolithographic techniques and by thermal mass transfer techniques. These techniques can be used to form highly uniform spacers that typically include a binder material. The binder material can help prevent migration of the spacers by adhering to the substrate. In addition, the binder material can give more compressibility to the spacers during assembly of the display, thus reducing stresses on the glass substrates during assembly, and can be hardened after assembly to hold the desired spacing. The sizes of the spacers can also be better controlled. These factors can allow thinner glass substrates to be used.

Selectively placed spacers can also be used as a black matrix. For example, spacers that have a relatively high optical density (e.g., 2 or greater) can be selectively placed in alignment with devices on active substrates to prevent undesired light induced activation of the devices. FIG. 2(b) shows a construction where spacers 42 are aligned with transistors 20.

An exemplary method for providing uniform spacers in flat panel displays is disclosed in U.S. Pat. No. 5,710,097. Spacer elements can be placed between substrates by selectively irradiating a thermal transfer donor sheet that comprises (a) a support, (b) an optional light-to-heat conversion layer, (c) an optional non-transferable interlayer, (d) a transferable spacer layer and (e) an optional adhesive layer. The process includes the following steps: (i) placing in intimate contact a receptor and the thermal transfer donor sheet described above, (ii) irradiating at least one of the thermal transfer donor sheet or the receptor (or a portion thereof, i.e., substrate, spacer layer, interlayer, light-to-heat conversion layer, and/or adhesive layer) with imaging radiation to provide sufficient heat in the irradiated areas to transfer the spacer layer to the receptor, and (iii) transferring the transferable spacer layer in the irradiated areas to the receptor.

The thermal transfer donor sheet can be prepared by depositing layers (b), (c), (d) and/or (e) described above onto a support. The support may be constructed of any material known to be useful as a support for a thermal transfer donor sheet. The support may be either a rigid sheet material such as glass or a flexible film. The support may be smooth or rough, transparent, opaque, translucent, sheet-like or non-sheet-like. Suitable film supports include polyesters, especially polyethylene terephthalate (PET), polyethylene naphthalate (PEN), polysulfones, polystyrenes, polycarbonates, polyimides, polyamides, cellulose esters such as, cellulose acetate and cellulose butyrate, polyvinyl chlorides and derivatives thereof, and copolymers comprising one or more of the above materials. Typical thicknesses of the support are between about 1 to 200 microns.

The transferable spacer layer may include organic materials, inorganic materials, or a composite comprising organic materials or inorganic materials that have particles or fibers incorporated therein. Suitable materials include any number of known polymers, copolymers, oligomers and/or monomers. Suitable polymeric binders include materials such as thermoset, thermosettable, or thermoplastic polymers, including phenolic resins (i.e., novolak and resole resins), polyvinylacetates, polyvinylidene chlorides, polyacrylates, cellulose ethers and esters, nitrocelluloses, polycarbonates, polysulfones, polyesters, styrene/acrylonitrile polymers, polystyrenes, cellulose ethers and esters, polyacetals, (meth)acrylate polymers and co-polymers, polyvinylidene chloride, a-chloroacrylonitrile, maleic acid resins and copolymers, polyimides, poly(amic acids), and poly(amic esters) and mixtures thereof.

When the transferable spacer layer includes a thermosettable binder, the thermosettable binder may be crosslinked after transfer to the receptor. The binder may be crosslinked by any method which is appropriate for that particular thermosettable binder, for example, exposing the thermosettable binder to heat, irradiating with a suitable radiation source, or a chemical curative.

Particles or fibers may be added to the transferable spacer layer to form a composite. The addition of particles or fibers to the transferable spacer layer may be accomplished by using any known particle or fiber with a spacing dimension less than or equal to the spacing required in the particular display device of interest. The particles may have a spacing dimension smaller than the thickness of the transferable spacer layer or a spacing dimension larger than the thickness of the transferable spacer layer. When the particle size is smaller, the thickness of the transferable spacer layer controls the spacing within the display device. Whereas, when larger particles are used the spacing dimension of the particles used in the composite controls the spacing in the display device. Preferably at least 5% of the particles have a spacing dimension greater than the thickness of the spacer layer and more preferably at least 10%. Either approach may be used as a means for achieving uniform separation and support of the substrates within the display. Suitable particles include organic and/or inorganic materials (solid or hollow) having any suitable shape (i.e., spheres, rods, posts, triangles, and trapezoids) and size distribution consistent with maintaining the desired separation. Preferred particles include current LCD spacer spheres, rods, etc. comprised of glass or plastic such as those referenced in Japanese Kokai Patent Application No. HEI 7[1995]-28068; U.S. Pat. Nos. 4,874,461; 4,983,429; and 5,389,288. In LCD displays, it is preferred that the standard deviation for the size distribution of particles is + or −20% of the mean particle spacing dimension (i.e., mean diameter of a spherical or cylindrical shaped particle, or average height of a cylindrical shaped particle). More preferably, the standard deviation is + or −10% of the mean. Most preferably, the standard deviation is + or −5% of the mean. When a fiber is used, the dimensions are typically measured as the denier or fineness) of the fiber.

Dispersants, surfactants and other additives (i.e., antioxidants, light stabilizers, and coating aides) may be included to aide in the dispersion of the particles and/or fibers or impart other desirable properties to the transferable spacer layer as known to those skilled in the art.

The compressibility of the element bearing the forces in the display (e.g., the particles in the case where the spacer layer comprises particles with a particle spacing dimension greater than the thickness of the transferable spacer layer and the transferable spacer layer in cases where the spacer layer does not comprise particles with particle spacing dimensions greater than the thickness of the transferable spacer layer) should be sufficient to maintain a uniform spacing gap in the corresponding display.

The receptor for spacer placement may be any flat panel display element benefiting from the application of spacers. The spacers can be precisely placed in the desired locations to avoid optical interference in the display windows of the display device. The receptor may be optionally coated with an adhesive topcoat to facilitate the transfer of the transferable spacer layer to the receptor.

Referring again to FIG. 1, bottom substrate 212 and top substrate 226 can be any type of substrate suitable for display applications. Substrates suitable for use in transmissive or transflective liquid crystal displays of the present invention include rigid or flexible substrates that are substantially transmissive to visible light. Non-birefringent substrates are particularly suited. Examples of rigid substrates include glass, low temperature polysilicon (LTPS), and rigid plastic. Suitable flexible substrates include substantially clear and transmissive polymer films. Suitable polymer substrates include polyester base (e.g., polyethylene terephthalate, polyethylene naphthalate), polycarbonate resins, polyolefin resins, polyvinyl resins (e.g., polyvinyl chloride, polyvinylidene chloride, polyvinyl acetals, etc.), cellulose ester bases (e.g., cellulose triacetate, cellulose acetate), and other conventional polymeric films used as supports in various imaging arts. Transparent polymeric film base of 2 to 100 mils (i.e. 0.05 to 2.54 mm) is preferred.

For glass substrates, a preferred thickness is 0.2 to 2.0 mm. It is often desirable to use glass substrates that are 1.0 mm thick or less, or even 0.7 mm thick or less. Thinner substrates result in thinner and lighter weight displays. Certain processing, handling, and assembling conditions, however, may suggest that thicker substrates be used. For example, some assembly conditions may require compression of the display assembly to fix the positions of spacers disposed between the substrates. The spacers are distributed to help maintain a uniform gap between the substrates in which the liquid crystal material can be disposed. Under such assembly conditions, suitable substrates are those that can withstand the stresses required to compress the spacers as well as resist local deformation caused by larger spacers that undergo higher compressive stressing. The competing concerns of thin substrates for lighter displays and thick substrates for reliable handling and processing can be balanced to achieve a preferred construction for particular display dimensions. As described above, an improved display of the present invention can include spacers that allow reliable assembly of displays that have thinner substrates.

If the substrate is a polymeric film, it is preferred that the film be non-birefringent to substantially prevent interference with the operation of the display in which it is to be integrated. Exemplar; non-birefringent substrates are polyesters that are solvent cast. Typical examples of these are those derived from polymers consisting or consisting essentially of repeating, interpolymerized units derived from 9,9-bis-(4-hydroxyphenyl)-fluorene and isophthalic acid, terephthalic acid or mixtures thereof, the polymer being sufficiently low in oligomer (i.e., chemical species having molecular weights of about 8000 or less) content to allow formation of a uniform film. This polymer has been disclosed as one component in a thermal transfer receiving element in U.S. Pat. No. 5,318,938. Another class of non-birefringent substrates are amorphous polyolefins (e.g., those sold under the trade designation Zeonex™ from Nippon Zeon Co., Ltd.).

In particular embodiment of a display of the present invention, a bottom polarizer (or combination of polarizers) can be selected to improve display performance. Referring again to FIG. 1, polarizer 210 can be a reflective polarizer, dichroic polarizer, or other suitable polarizer or combination of polarizers. For back-lit display modes that use a light source such as light source 202 to illuminate the display from below the bottom substrate 212, an exemplary polarizer 210 is a combination of a reflective polarizer and a dichroic polarizer. For example, FIG. 2(b) shows a combination bottom polarizer 64 that includes a reflective polarizer 60 and a dichroic polarizer 62. An exemplary combination polarizer is disclosed in International Publication WO 95/17691, the disclosure of which is wholly incorporated by reference into this document. The reflective and dichroic polarizers can be provided in close proximity to one another, and are preferably bonded together to eliminate the air gap between the polarizers. A particularly suited reflective polarizer/dichroic polarizer combination is one in which a polyvinyl alcohol (PVA) coating is disposed on a multilayer birefringent reflective polarizer and is concurrently oriented. The PVA is dyed to form a dichroic polarizer coating on the reflective polarizer, as disclosed in International Publication WO 95/17691. The combination of a dichroic polarizer coated onto a reflective polarizer can provide a particularly thin and efficient polarizer.

An advantage of including, reflective polarizer in the bottom polarizer of a display of the present invention is that light having an undesired polarization state can be reflected by the reflective polarizer and recycled for transmission through the reflective polarizer. Recycling of light in this manner can allow more light to pass through the display relative to using absorptive polarizers. This can allow brighter displays that use less power. Particularly suited reflective polarizers include birefringent multilayer reflective polarizers as disclosed in U.S. Pat. No. 5,686,979 and in International Publication WO 95/17691 and birefringent diffusely reflective polarizers as disclosed in International Publication WO 97/32226. When birefringent multilayer reflective polarizers are combined with a dichroic polarizer coating as discussed above, a particularly thin combination reflective/dichroic polarizer can be obtained that can also enhance the brightness of the display.

All of the patents and patent applications cited are incorporated into this document in total as if reproduced in full.

This invention may be suitably practiced in the absence of any element not specifically described in this document.

Various modifications and alterations of this invention will be apparent to one skilled in the art from the description herein without departing from the scope and spirit of this invention. Accordingly, the invention is to be defined by the limitations in the claims and any equivalents thereto.

What is claimed is:

1. A process for making a color display substrate comprising the steps of:

provid ing a display substrate;

thermally mass transferring a plurality of color filters to selected portions of the substrate, each color filter comprising a colorant in a crosslinkable composition;

inspecting the color filters after the transferring step and prior to crosslinking the color filters; and performing a washing step, if necessary, to remove the color filters from the substrate for reworking of the display substrate.

2. The process of claim 1, wherein the step of thermally mass transferring a plurality of color filters comprises:

providing a donor sheet comprising a base layer, a light to heat converter, and a transfer layer comprising a colorant in a crosslinkable composition;

placing the transfer layer proximate to the display substrate; and selectively irradiating portions of the donor sheet to thermally transfer portions of the transfer layer from the donor sheet to the display substrate.

3. The process of claim 1, further comprising the step of forming a black matrix on the display substrate.

4. The process of claim 1, wherein the display substrate includes a plurality of independently addressable active devices.

5. The process of claim 4, further comprising the step of forming through holes in the color filters to allow electrical connection of transparent conductive sub-pixel electrodes to the independently addressable active devices.

6. The process of claim 5, wherein the step of forming through holes in the color filters comprises patterning a photoresist on the color filters and etching portions of the color filters left exposed by the patterned photoresist.

7. The process of claim 5, wherein the step of forming through holes in the color filters comprises laser ablating portions of the color filters.

8. The process of claim 1, further comprising crosslinking the color filters after the transferring step.

9. A process for making a display substrate comprising the steps of:

providing an active display substrate having a plurality of independently addressable active devices thereon;

thermally transferring a plurality of color filters to the active substrate, each color filter comprising a colorant in a crosslinkable composition;

inspecting the color filters after the transferring step;

performing a washing step, if necessary, to remove the color filters from the active substrate for reworking of the active substrate; and crosslinking the color filters after the inspecting step.

10. The process of claim 9, wherein the step of thermally transferring a plurality of color filters comprises:

providing a donor sheet comprising a base layer, a light to heat converter, and a transfer layer comprising a colorant in a crosslinkable composition;

placing the transfer layer proximate to the active substrate; and selectively irradiating portions of the donor sheet to thermally transfer portions of the transfer layer from the donor sheet to the active substrate.

11. A process for making a liquid crystal display comprising the steps of:

forming a first substrate by providing an active display substrate having a plurality of independently addressable active devices thereon, thermally transferring a plurality of color filters to the active substrate, each color filter comprising a colorant in a crosslinkable composition, inspecting the color filters after the transferring step, performing a washing step, if necessary, to remove the color filters from the active substrate for reworking of the active substrate, and crosslinking the color filters after the inspecting step;

providing a second substrate;

disposing a bistable liquid crystal layer comprising a fluorinated chiral ferroelectric liquid crystal material between the first and second substrates to thereby form a liquid crystal panel capable of selectively altering a polarization of light transmitted therethrough;

disposing the liquid crystal panel between a first polarizer and a second polarizer; and providing a light source on a side of the first polarizer opposing the liquid crystal display panel so that during operation of the liquid crystal display, light from the light source can be polarized by the first polarizer and transmitted to the liquid crystal panel for selective polarization alteration.

12. The process of claim 11, wherein thermally transferring a plurality of color filters comprises providing a donor sheet comprising a base layer, a light to heat converter, and a transfer layer comprising a colorant in a crosslinkable composition, placing the transfer layer proximate to the active substrate, and selectively irradiating portions of the donor sheet to thermally transfer portions of the transfer layer from the donor sheet to the active substrate.

13. The process of claim 11, wherein the active substrate further comprises a black matrix disposed to separate sub-pixels, the black matrix having an optical density sufficient to provide optical contrast between sub-pixels and a resistivity to substantially prevent crosstalk between adjacent independently addressable transistors.

14. The process of claim 11, further comprising selectively thermally mass transferring a plurality of spacers between the first and second substrates to maintain a substantially uniform gap therebetween.

15. The process of claim 11, wherein the first polarizer comprises a birefringent reflective polarizer and a dichroic polarizer.

* * * * *

UNITED STATES PATENT AND TRADEMARK OFFICE
CERTIFICATE OF CORRECTION

PATENT NO.    : 6,221,543 B1
DATED         : April 24, 2001
INVENTOR(S)   : Paul F. Guehler et al.

It is certified that error appears in the above-identified patent and that said Letters Patent is hereby corrected as shown below:

Column 3,
Line 54, after "display," insert -- it --.

Column 10,
Line 35, delete "Walfingford" and insert -- Wallingford --.

Column 11,
Line 12, delete the second occurrence of "10 µm" and insert -- 1 µm --.

Column 15,
Line 2, delete "ax" and insert -- an --.

Column 22,
Line 13, delete "x" and insert -- $\lambda$ --.
Line 19, delete "k/2" and insert -- $\lambda/2$ --.

Column 25,
Line 62, delete "Examplar;" and insert -- Exemplary --.

Signed and Sealed this

Twenty-fourth Day of September, 2002

*Attest:*

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO.    : 6,221,543 B1
DATED         : April 24, 2002
INVENTOR(S)   : Guehler, Paul F.

It is certified that error appears in the above-identified patent and that said Letters Patent is hereby corrected as shown below:

Title Page,
Item [73], Assignee, delete "Innovatives" and insert -- Innovative --

Signed and Sealed this

Thirty-first Day of December, 2002

JAMES E. ROGAN
*Director of the United States Patent and Trademark Office*